R. O. MOREIDA.
BICYCLE HANGER AND CONE LOCKING DEVICE.
APPLICATION FILED JUNE 11, 1919.
1,361,398.
Patented Dec. 7, 1920.
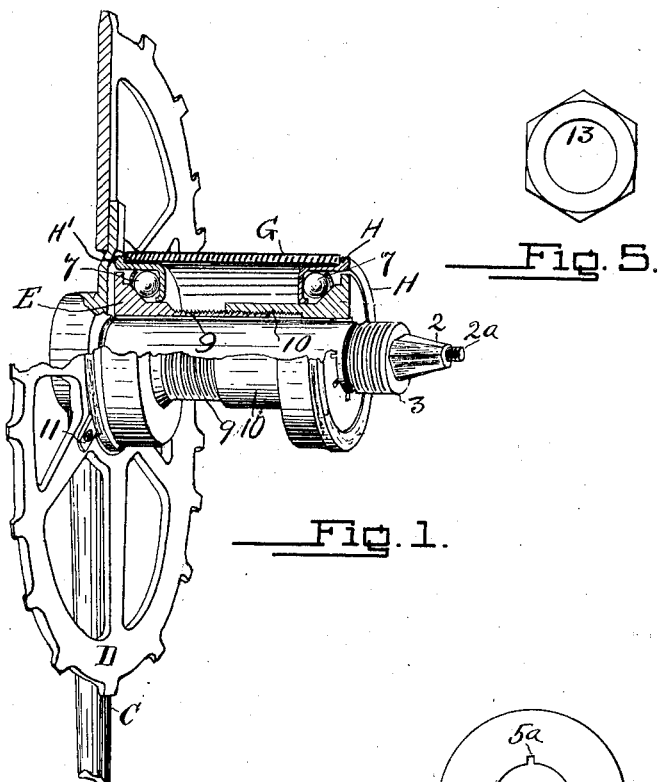
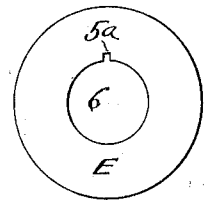
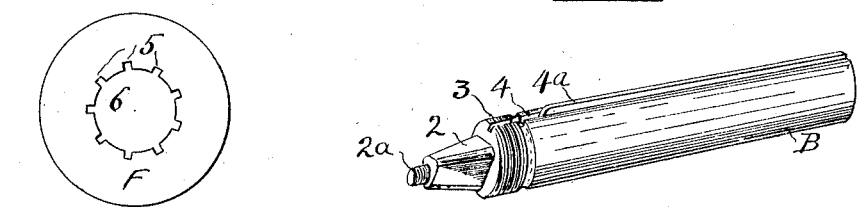
INVENTOR
Robert O. Moreida
BY
Francis C. Huebner,
ATTORNEY

UNITED STATES PATENT OFFICE.

ROBERT O. MOREIDA, OF FRESNO, CALIFORNIA.

BICYCLE-HANGER AND CONE-LOCKING DEVICE.

1,361,398.     Specification of Letters Patent.     Patented Dec. 7, 1920.

Application filed June 11, 1919. Serial No. 303,280.

*To all whom it may concern:*

Be it known that I, ROBERT O. MOREIDA, a citizen of the United States, and resident of Fresno, in the county of Fresno and the State of California, have invented a new and useful Improvement in Bicycle-Hangers and Cone-Locking Devices, of which the following is a specification.

My invention relates to a bicycle hanger, and more especially to means for adjusting and locking the cones in a ball-bearing in a fixed relation with the cup ball races. Other objects are hereinafter referred to.

In the drawing accompanying this specification Figure 1 is a perspective view of the sprocket complete with parts cut away and in section. Fig. 2 is an end view of one of the cones. Fig. 3 is an end view of the other cone. Fig. 4 is a perspective view of the shaft. Fig. 5 is a nut.

In said drawing B is the sprocket shaft having the crank C attached at one end. D is the sprocket wheel which is attached by ordinary means, to wit bolts 11, to the shaft B. At the other end shaft B has a threaded portion 3, and adjacent thereto an angular extension 2, the outside end being constructed as a reduced threaded portion $2^a$. The angular portion and reduced threaded end are intended to be adapted for a conventional means in attaching a crank. 4 is a lateral groove in the shaft, forming a keyway, and $4^a$ is a key fitted into the keyway. G is the housing, or barrel of the hanger. H and $H^1$ are two cups, or ball races attached to the inside of the barrel G, one at each end, the open portion of the cups being outward. 7 are a plurality of uniform size balls adapted to travel in the ball races H and $H^1$. E and F are cones adapted to bear against the balls 7. For the purpose of adjusting the cones in relation to the balls 7 and cups H and $H^1$ I have formed tubular extensions 9 and 10 on the cones F and E as shown in the drawing, providing the extension 9 with a male thread and extension 10 with a female thread so they can be screwed together. By this means it will be noted that when the cup ball-races, and balls and cones are assembled, the cones can be drawn toward each other by the screw means described until the desired adjustment of the bearing is secured. For the purpose of locking the cones in such relation I have formed the cones with circular holes 6 therethrough along their axes of such size that the axle B can snugly be placed therein. Cone E has a single keyway $5^a$, laterally therein and cone F has a plurality of keyways 5, laterally therethrough, said keyways being adapted to receive key $4^a$. It will be noted that the cone E should be moved so that one of the keyways 5 will register with the keyway $5^a$ nearest the place of adjustment and then the axle 4 can be inserted with the key $4^a$ engaging the keyways 4, 5 and $5^a$. It will be noted that by this adjustment the cone assembly E and F can be formed with the extensions 9 and 10 so that it can be fitted to barrels G of varying lengths. 13 is a nut adapted to screw on threaded portion 3, its purpose being to hold the shaft B from slipping out.

I claim as new and ask for Letters Patent:

1. In a ball bearing assembly, the combination of a barrel having a cup therein at each end adapted as a ball race, balls constructed to fit in the ball race, a pair of cones fitted to the cups so that the assembled cups, balls and cones form a ball bearing, together with means for adjusting the distance between the cones and for locking the cones together in the adjustment desired consisting of tubular extensions on the cones adapted to be screwed together, said cones being adapted to receive a shaft therethrough along the conical axes of the cones, a lateral keyway through one of said cones, a plurality of uniform lateral keyways through the other cone, a shaft having a lateral keyway therein, one keyway in each of said cones and in the shaft being adapted to register, and a key fitted in said keyways, substantially as described.

2. In a device of the character described the combination of a barrel, ball bearing cups in each end of the barrel, balls adapted to fit in the ball bearing cups, and a cone assembly consisting of two ball bearing cones having tubular extensions in line with the axis of the cones, said tubular extensions being constructed so that one will screw into the other, said cones and extensions having a hole in line with the axis of the cones adapted to carry a shaft, a keyway laterally through the hole in one of said cones and a plurality of uniform size keyways laterally in the hole of the other cone said keyways being adapted to selectively register with the keyway in the other cone, and key means on the shaft adapted to interlock in the registering keyways in the cones, substantially as described.

ROBERT O. MOREIDA.

Witnesses:
 CLEO K. CURTIS,
 HERBERT A. HUEBNER.